United States Patent
Kozawa et al.

(10) Patent No.: US 6,355,730 B1
(45) Date of Patent: *Mar. 12, 2002

(54) PERMSELECTIVE MEMBRANES AND METHODS FOR THEIR PRODUCTION

(75) Inventors: Hidetoshi Kozawa, Kyoto; Ichiro Itagaki, Kanagawa-ken; Kenji Nishikawa; Kazumi Tanaka, both of Shiga-ken, all of (JP)

(73) Assignee: Toray Industries, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/353,134

(22) Filed: Jul. 14, 1999

Related U.S. Application Data

(63) Continuation-in-part of application No. 08/672,671, filed on Jun. 28, 1996, now abandoned.

(30) Foreign Application Priority Data

Jun. 30, 1995 (JP) ............................................. 7-166461

(51) Int. Cl.⁷ ........................ B01D 71/68; B01D 71/40; C08L 81/06; C08L 39/06
(52) U.S. Cl. ........................ 525/189; 522/1.1; 521/62; 521/63; 210/646; 210/500.41; 210/500.42; 210/500.38
(58) Field of Search .......................... 525/189; 521/62, 521/63; 210/646, 500.41, 500.42, 500.38; 522/111

(56) References Cited

U.S. PATENT DOCUMENTS

| | | | |
|---|---|---|---|
| 4,906,375 A | | 3/1990 | Heilmann |
| 5,436,068 A | | 7/1995 | Kobayashi |
| 5,762,798 A | * | 6/1998 | Wenthold |
| 5,938,929 A | * | 8/1999 | Shimagaki |

FOREIGN PATENT DOCUMENTS

| | | |
|---|---|---|
| EP | 0 082 433 | 6/1983 |
| EP | 0 168 783 | 1/1986 |
| EP | 0 509 663 A1 | 10/1992 |
| EP | 0 550 798 A1 | 7/1993 |
| JP | 58-114702 | 8/1983 |
| JP | 6-75667 | 10/1986 |
| JP | 6-232860 | 10/1986 |
| JP | 2-18695 | 4/1990 |
| JP | 254826 | 11/1991 |
| JP | 4-300636 | 10/1992 |
| JP | 4-338223 | 11/1992 |
| JP | 4-338224 | 11/1992 |
| JP | 5-54373 | 12/1993 |
| JP | 62-233921 | 8/1994 |

OTHER PUBLICATIONS

Patent Abstracts of Japan, vol. 17 No. 185, Apr. 12, 1993, Abstract.
Database WPI Week 9502, Derwent Publications Ltd. London, GB, AN 95–010906, Abstract.
Database WPI Week 9302, Derwent Publications Ltd., London, GB, AN 93–012089. Abstract.
Miyano "Retention of PVP Swelling Agent in PES Membrane" J. of Applied Polymer Science vol. 41, pp. 407–417; 1990.

* cited by examiner

*Primary Examiner*—David J. Buttner
(74) *Attorney, Agent, or Firm*—Nixon & Vanderhye

(57) ABSTRACT

Membrane materials for removing uremic toxins from a hydrophobic polymer such as polysulfone and two polyvinyl pyrrolidones, hydrophilic polymers of different molecular weights, that is 10–50 wt. % of a low molecular weight component (molecular weight<100,000) and 90–50 wt. % of a high molecular weight component (molecular weight≧100,000). The membranes are permselective useful in dialysis. The membrane material may have an overall mass transfer coefficient ($K_0$), for a Strokes' radius of at least 30 Å (as determined by a diffusion test during dextran), of ≧0.0025 cm/min and a permeability to albumin of ≦4%.

18 Claims, 3 Drawing Sheets

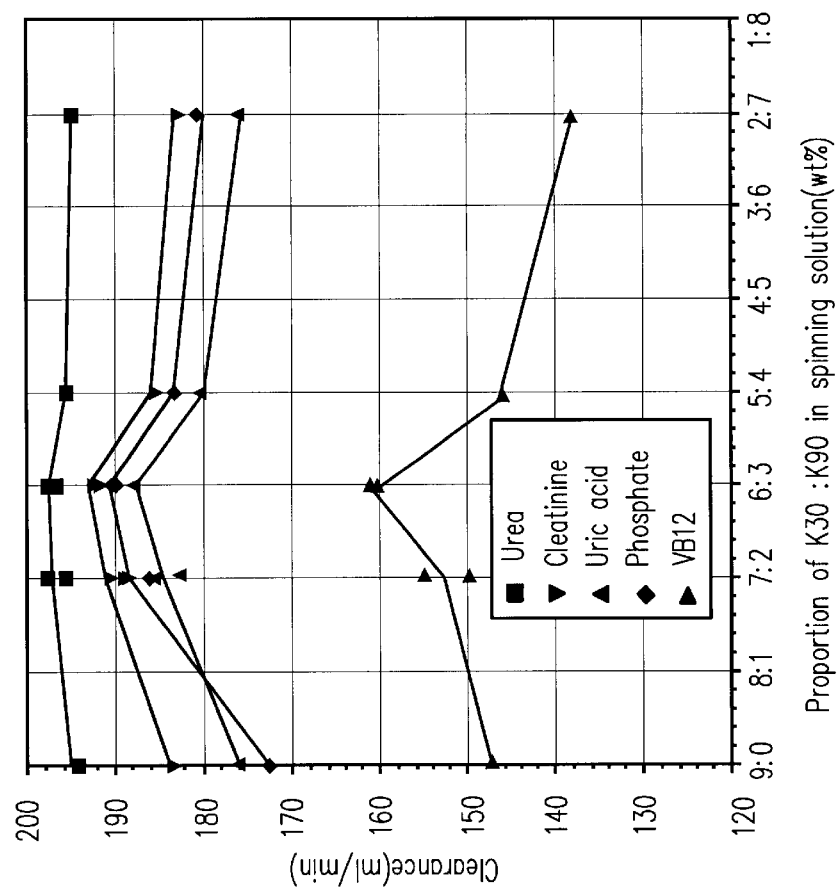
Fig. 4 Clearance of Urea to VB12 in module(1.8m²)
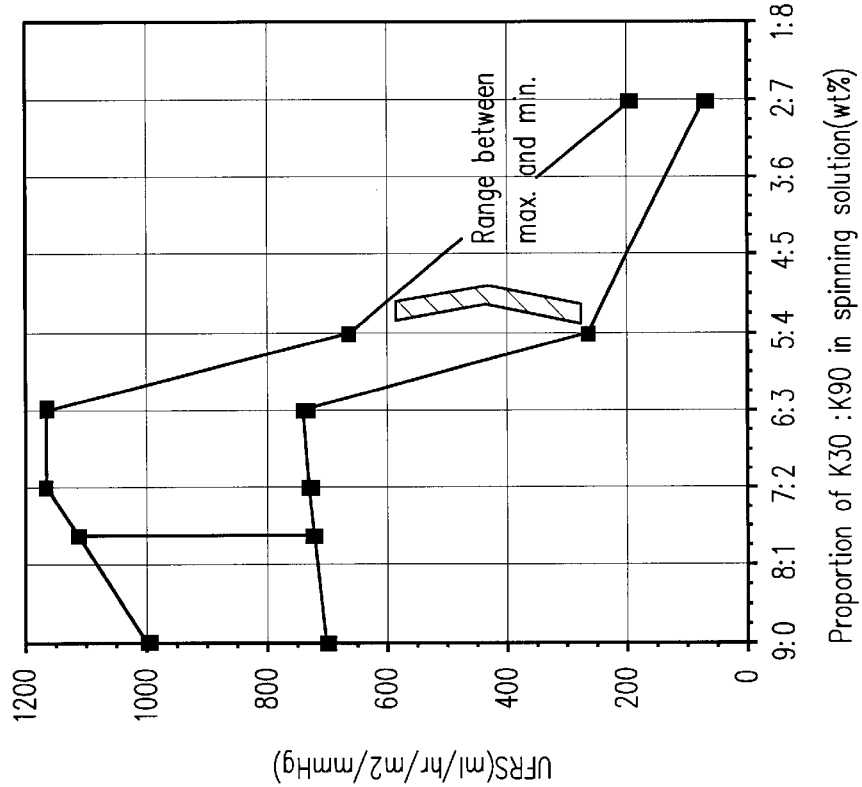
Fig. 3 Water permeability of hollow fiber

PERMSELECTIVE MEMBRANES AND METHODS FOR THEIR PRODUCTION

CROSS REFERENCE TO RELATED APPLICATIONS

This application is a continuation-in-part of earlier application Ser. No. 08/672,671 filed Jun. 28, 1996 now abandoned.

The present invention relates to permselective membranes and to methods for their production. Specifically, it relates to permselective membranes which, when used for blood treatment, maintain a high hemofiltration rate and a low albumin permeability for a long period of time through control of the molecular weight distribution of the hydrophilic polymer in the membrane, and which are high in permselectivity to uremic toxins including medium-to-high molecular weight proteins, and also relates to methods for their production.

BACKGROUND OF THE INVENTION

Natural materials such as cellulose and synthetic polymer membrane materials such as polysulfone, polymethylmethacrylate (PMMA) and polyacrylonitrile have been widely used in semipermeable membranes for blood treatment, and various studies have been made in an attempt to develop dialysis techniques which function similarly to the human kidney in performing blood treatment for patients with chronic renal failure. Of these membranes, much attention has recently been focused on polysulfone as it is sufficiently high in permeability to meet the latest improved dialysis techniques. Conventionally, polysulfone has been widely used as heat-resistant, thermoplastic engineering plastics material in the fields of automobiles, electric appliances, and medical devices. A semipermeable membrane made of polysulfone alone, however, is too high in intermolecular cohesive strength and low in affinity with blood because of its hydrophobic nature, and therefore cannot be applied to blood treatment. To solve this problem, a method was proposed wherein pores were produced by adding and subsequently leaching such pore-forming additives as hydrophilic polymers and inorganic salts while simultaneously forming a hydrophilic surface over the polymer material to provide a semipermeable membrane or a reverse osmosis membrane. Since then, a variety of published patent applications have appeared. Such methods for producing semipermeable membranes for blood treatment include those listed below:

a method wherein a metal salt is added in forming a membrane;
  a method wherein a hydrophilic polymer is added in forming a membrane; and
  a method wherein a polyhydric alcohol is added in forming a membrane.

In the case of JP-A-61-232860 and JP-A-58-114702, where a polyhydric alcohol such as polyethylene glycol is added in forming a membrane, however, insufficient rinsing leaves residual alcohol in the membrane, which may cause trouble in the eyes of patients during dialysis. In the case of JP-B-06-075667, a membrane formation method which uses polyvinyl pyrrolidone is disclosed, but the resultant membrane, though high in water permeation performance, is too high in albumin permeability for use in blood treatment (dialysis). A similar problem can occur in the case of JP-A-62-121608 where a metal salt is used. JP-A-6-233921 proposes a hollow yarn membrane production method in which a high molecular weight hydrophilic polymer is added to increase the viscosity so that a good solvent for the solution can be used as total core liquid. This method, however, cannot control the albumin permeability of the membrane. Furthermore, no description is given concerning the diffusing performance of the resultant hollow yarn membrane, and no information is provided on the molecular weight distribution of the hydrophilic polymer in the membrane. By the method disclosed in JP-B-02-018695, a membrane that is high in stain resistance and easy to clean can be produced by adding high molecular weight polyvinyl pyrrolidone up to a high content relative to polysulfone to allow large amounts of polyvinyl pyrrolidone to remain in the membrane, though such a high diffusing performance as sought in the present invention cannot be achieved. Moreover, JP-B-05-054373 discloses a membrane which is produced by starting with a low-viscosity solution consisting of polysulfone and relatively low molecular weight polyvinyl pyrrolidone and ending with washing for nearly complete removal of the polyvinyl pyrrolidone. However, there is no reference to a high diffusing performance associated with the molecular weight distribution of the hydrophilic polymer remaining in the membrane. As more than 20 years has passed since the advent of dialysis, many complications caused by long-term dialysis have been reported, especially recently, and attention is now focused on proteins with molecular weights of 20,000 to 40,000 as causative agents of the carpal canal syndrome and other dialysis syndromes. None of the above patent publications, however, has disclosed a hollow yarn membrane that can play or imitate the role of the human kidney in positively removing such proteins as listed above.

After earnest studies aiming to solve the above problems, we found a permselective membrane, in accordance with the invention, which allows dialysis to be carried out during which the membrane minimizes the permeability to albumin, a useful protein, while at the same time maintaining a high water permeability, and efficiently removing medium-to-high molecular weight uremia-causing proteins. We also found a method for production of such a membrane.

BRIEF DESCRIPTION OF THE DRAWINGS

FIG. 3 is a graph comparing water permeability for various hollow fibers prepared with different ratios of low molecular weight and high molecular weight polyvinyl pyrrolidone in the spinning solution from which the hollow fibers were made; and FIG. 4 is a graph comparing the clearance rate of various components such as urea for various fibers prepared with different ratios of low molecular weight and high molecular weight polyvinyl pyrrolidone in the spinning solution from which the hollow fibers were made.

DETAILED DESCRIPTION OF THE INVENTION

Figure 1:
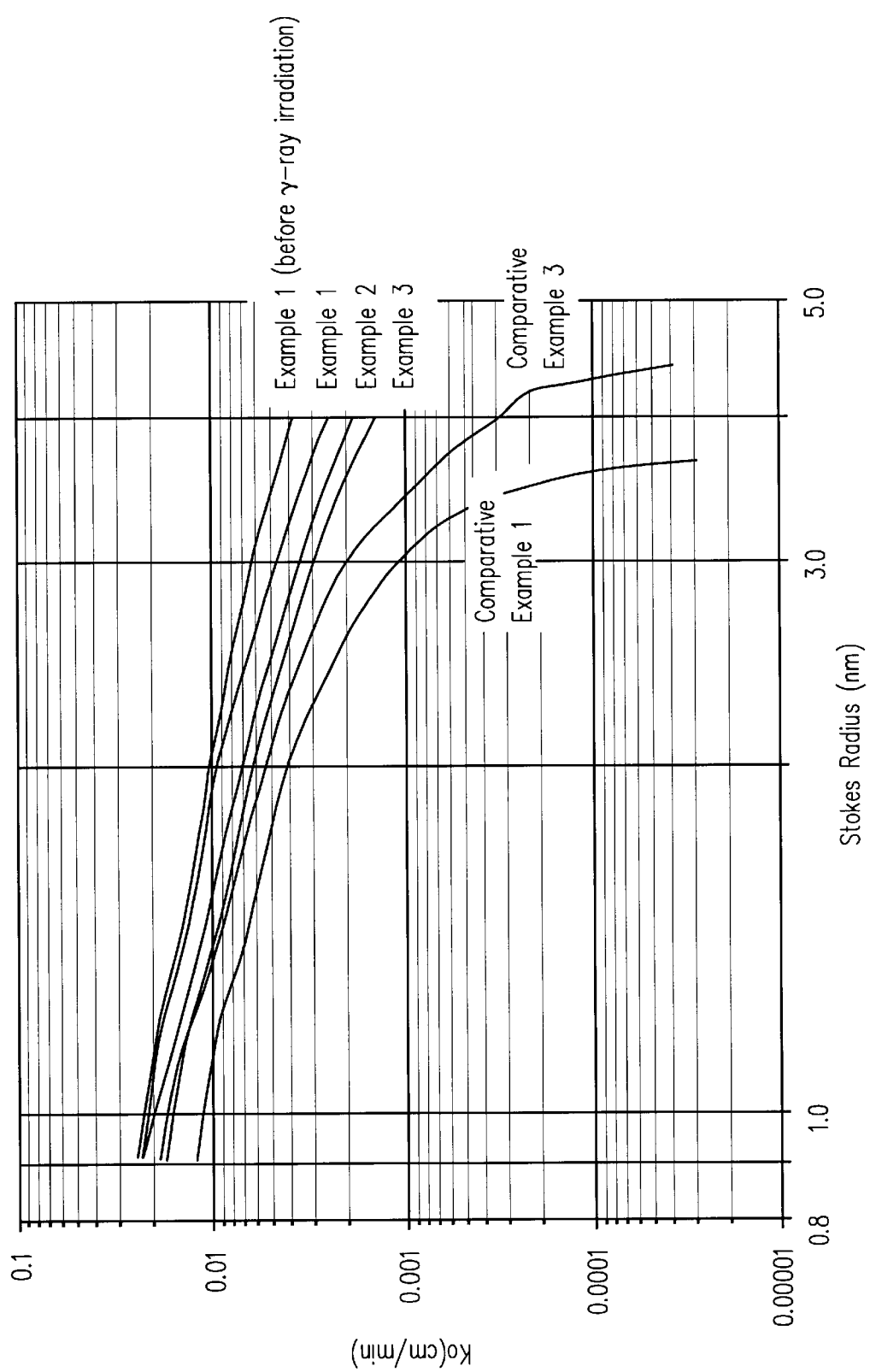
FIG. 1 is a graph illustrating the molecular weight distribution of polyvinyl pyrrolidone, a hydrophilic polymer, in a membrane prior to gamma-ray irradiation.

According to one aspect, the present invention provides a membrane comprising a hydrophobic polymer and a hydrophilic polymer wherein the hydrophilic polymer consists, by weight of the total weight of the hydrophilic polymer, of 10–50 wt % of a low molecular weight component having molecular weight less than 100,000 and 90–50 wt % of a high molecular weight component having molecular weight 100,000 or more. As the hydrophobic polymer, a polysulfone and as the hydrophilic polymer, a polyvinyl pyrrolidone, is preferable. According to another aspect, the invention provides such a membrane which additionally contains crosslinking groups.

Yet another aspect of the present invention provides a permselective membrane having an overall mass transfer coefficient ($K_0$), for a Stokes' radius of at least 30 Å, of 0.0025 cm/min or more, as determined by a diffusion test using dextran, and a permeability to albumin of 4% or less, preferably 3% or less, more preferably 2% or less.

Still other aspects of the invention provide the use of a membrane according to any of the above aspects in an in vitro permselective filtration process, for example, removal of endotoxins from a dialysate, and a permselective material comprising such a membrane for use in dialysis.

The present invention also provides, according to a still further aspect, a method for producing a polymeric membrane comprising forming a solution comprising a hydrophobic polymer, a hydrophilic polymer and a solvent, and preferably additionally an additive, wherein the hydrophilic polymer consists of two or more components having different molecular weights, a low molecular weight said component having a molecular weight less than 100,000 and a high molecular weight said component having a molecular weight of at least 100,000 and the solvent being capable of dissolving each of the hydrophobic and hydrophilic polymers and being compatible with any additive which may be present, forming the solution into a membrane and removing the solvent and (when present) the additive from the membrane to obtain the polymeric membrane. Preferably, the solution contains 1.8–20 wt %, relative to the total weight of the solution of the high molecular weight component of the hydrophilic polymer.

In a preferred method, the amount of the low molecular weight component of the polyvinyl pyrrolidone in the solution is 20–70% by weight of the total weight of polyvinyl pyrrolidone.

As the hydrophobic polymer, almost any engineering plastics material such as polysulfone, polyamide, polyimide, polyphenyl ether, or polyphenyl sulfide may be used, but a polysulfone resin, especially an aromatic sulfone polymer having residues containing a phenylene group and a sulfone group, is preferable, a more especially preferred polysulfone containing residues which may be represented by the following formula. The formula given below shows the skeleton of a typical such polysulfone, but the benzene ring portions may be modified.

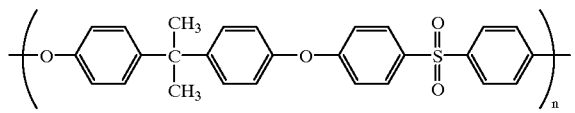

The hydrophilic polymer components having high molecular weight (2-1) and low molecular weight (2-2) to be used here are preferably polymers which, before any crosslinking (as later described), are soluble in water at 25° C. and include polyethylene glycol, polyvinyl alcohol, carboxymethyl cellulose and polyvinyl pyrrolidone, each of which may be used alone or in combination with each other. There are no specific limitations as to their use, but polyvinyl pyrrolidone is preferable as it is relatively high in industrial availability.

Two or more hydrophilic polymer components with different molecular weights are used in the present invention. Concerning their molecular weight distribution, the weight-average molecular weight of the high molecular weight component is preferably five times or more than that of the low molecular weight component.

As the solvent (3), an amphiprotic solvent which dissolves effectively and simultaneously the hydrophobic polymer, hydrophilic polymer and (when present) the additive is preferably used. Such solvents include dimethylacetamide, dimethylformamide, dimethyl sulfoxide, acetone, acetaldehyde, and 2-methyl pyrrolidone, of which dimethylacetamide is preferable in terms of safety, toxicity and generally avoiding hazardous properties.

The additive (4) is preferably a substance which is a poor solvent for the hydrophobic polymer, but which has a compatibility with the hydrophilic polymer. Such additives include alcohol, glycerin, water, and esters, of which water is preferable in terms of process suitability. These particular additives are especially preferred when the hydrophobic polymer is a polysulfone.

Although not wishing to be bound by theory, the improvement in stability of the solution achieved by adding a high molecular weight hydrophilic polymer may be due to the following.

The substances used as the additive, most of which serve as a poor solvent for hydrophobic polymers, form a clathrate through an intermolecular force with a coexistent hydrophilic polymer and are not in direct contact with the hydrophobic polymer. Due to the high temperature reached during dissolution, however, part of it may break off to cause the re-crystallization of dimers and other oligomers resulting from the hydrophobic polymer, leading to cloudiness in the solution. As the hydrophilic polymer increases in molecular weight, clathration will occur more actively, thus stabilizing the solution more effectively.

Where, as in the case of polysulfones, at least the hydrophobic polymers produced commercially are available only at low molecular weights (in the case of polysulfones $\leq 34,000$), it is then convenient to control the viscosity of the solution by appropriate selection of the molecular weight of the hydrophilic polymer. Naturally, a decreased viscosity of the solution will cause breakage and swinging of yarns during the formation of the hollow yarn membrane, leading to a decreased stability of the process. This is another advantage to be gained by including a high weight average molecular weight component in the mixed solution. In this connection, it is pointed out that although such an advantage had already been appreciated for a hydrophilic polymer of generally high molecular weight (see JP-A-6-233921 supra), the prior art gave no indication as to the surprising advantages in membrane performance achieved by controlling the molecular weight distribution, as in accordance with the present invention.

Next, the polymer content in the solution will be described below. As stated above, membranes can be formed more efficiently as the polymer content increases, but the porosity will decrease and the water permeability will decline, indicating that there is an optimum range. For example, the optimum content range, by weight of the total weight of the solution, is 10–30%, preferably 15–25%, especially for polysulfone, a hydrophobic polymer, and 2–20%, preferably 3–15%, especially for polyvinyl pyrrolidone, a hydrophilic polymer. To produce a membrane that has both a high permselectivity and a low albumin permeability the use of two or more hydrophilic polymer components is essential, with the content of hydrophilic polymer chains with molecular weights of 100,000 or more preferably being in the range of 1.8–20 wt % based on the total weight of the solution. An excessively high content will lead to an excessive increase in the viscosity of the solution, which will result not only in difficulty in membrane formation but also in deterioration in its water permeability and diffusion performance. On the contrary, if the content is too low, it will be impossible to construct a desired network which is permeable to medium-to-high molecular weight uremia-causing proteins. A solution with such a composition, along with the core liquid, may be for example, discharged as a sheath liquid through an annular nozzle provided by an axial end of a double pipe consisting of a pair of, preferably coaxial, tubes, to form a hollow fibre membrane. Typically, the membrane is formed by discharging the core and sheath liquids into a coagulation bath, either directly (wet spinning process) or after travelling through an air gap (dry/wet spinning process), typically (and especially for a mixture of a polyvinyl sulfone and polyvinyl pyrrolidone) at a temperature of 30–50° C. Preferably, a plurality of such hollow fibres is arranged so as to provide a hollow yarn membrane. It may then be subjected to certain conventional processes required for washing and moisture retention, followed by taking up and membrane module production. In a typical washing process (especially for a mixture of a polysulfone and polyvinyl pyrrolidone) the membrane is rinsed with water at a temperature of 50–85° C. This washing step enables water soluble hydrophilic component present in the membrane to be washed out sufficiently to avoid heavy elution of the hydrophilic polymer which might otherwise occur during its use in an artificial kidney. To render the membrane even more suitable, it may be subjected to an insolubilization treatment in which at least a part of the hydrophilic polymer content of the membrane which was previously water soluble becomes insolubilized to be retained within the membrane. This may be achieved by a crosslinking process. Crosslinking is preferably performed by means of gamma-ray, electron beam, heat, or chemical treatment to minimize the elution. Most preferably crosslinking is effected by γ-ray irradiation, a preferred power being 10–50 KGy, more preferably 20–40 KGy.

The crosslinking may work, for example, to connect chains of the hydrophobic polymer, i.e. the matrix, with those of the hydrophilic polymer to decrease the elution of the hydrophilic polymer, making it possible to produce modules that meet the artificial organs standards. It appears likely that such treatment could cause some change in the performance or structure. However, the structure of the network which is highly permeable to medium-to-high molecular weight proteins will be more firmly maintained or strengthened as a result of the crosslinking treatment, and its performance will be kept nearly unchanged with only a slight deterioration.

Owing to the hydrophilic polymer network on the particulate surface of the hydrophobic polymer, which forms the skeleton of the hydrophobic polymer membrane, a permselective membrane produced as described above can effectively diffuse uremic toxins and capture albumin, a useful protein, thus providing a high-performance membrane for blood treatment. Surprisingly, we have found that the addition of a small amount of low molecular weight polymer chains to the high molecular weight hydrophilic polymer in the membrane acts to enhance the diffusing performance specifically for medium-to-high molecular weight proteins while controlling the permeability to albumin, a useful protein. This may be because an appropriate network with a permeability to medium molecular weight polymer chains getting into the large network of high molecular weight polymer chains. When only high molecular weight polymer chains are used, it will be impossible to achieve a low albumin permeability required for an artificial kidney, while maintaining a high water permeation performance. When only low molecular weight polymer chains are used, on the other hand, it will be difficult to control the pore size by properly changing the membrane formation conditions. A change in the membrane formation conditions is likely to make the process unstable, leading to a deterioration of the quality of the membrane, and furthermore, an increased water permeability will make the membrane unsuitable for dialysis blood treatment since sudden leakage of albumin is likely to occur at a certain point. Thus the optimum molecular weight ranges used in the present invention were identified. Specifically, it is important that for the hydrophilic polymer in the membrane, especially prior to any insolubilization, chains with molecular weights less than 100,000 represent 10–50% while chains of molecular weight 100,000 or more represent 90–50%, by weight of the total hydrophilic polymer. To achieve such characteristics as described above, furthermore, the content of the hydrophilic polymer in the membrane should be 3–15 wt %, based on the total weight of the hydrophobic and hydrophilic polymers. If it is extremely low, the membrane decreases in wettability to cause coagulation when coming in contact with blood.

A particularly preferred range of membranes embodying the invention, obtained after an insolubilization treatment, contained 2–15 wt % of material insoluble in at least one polar solvent, for example, dimethyl formamide (DMF), and had the following features: according to solid $^{13}$C-NMR spectral analysis, the membrane was made of a compound consisting of hydrophobic and hydrophilic polymers, and according to elemental analysis, the components of the insoluble material originating from the hydrophobic polymer and the hydrophilic polymer accounted for 15–40 wt % and 85–60 wt %, respectively. Thus, especially for a mixture of a polysulfone and a polyvinyl pyrrolidone which has been subjected to insolubilization, its solubility in DMF gives a good indication of the extent of crosslinking and therefore of any elution of hydrophilic polymer likely to occur during dialysis.

Test have shown that a membrane embodying the invention exhibited an overall mass transfer coefficient ($K_o$), for a Stokes' radius of at least 30 Å, of 0.0025 cm/min or more, as determined from a diffusion performance test with dextran, which will be illustrated later, and a permeability to albumin of 4% or less.

Preferred embodiments of the invention will now be described in more detail with reference to the accompanying drawings and Examples.

Figure 2:
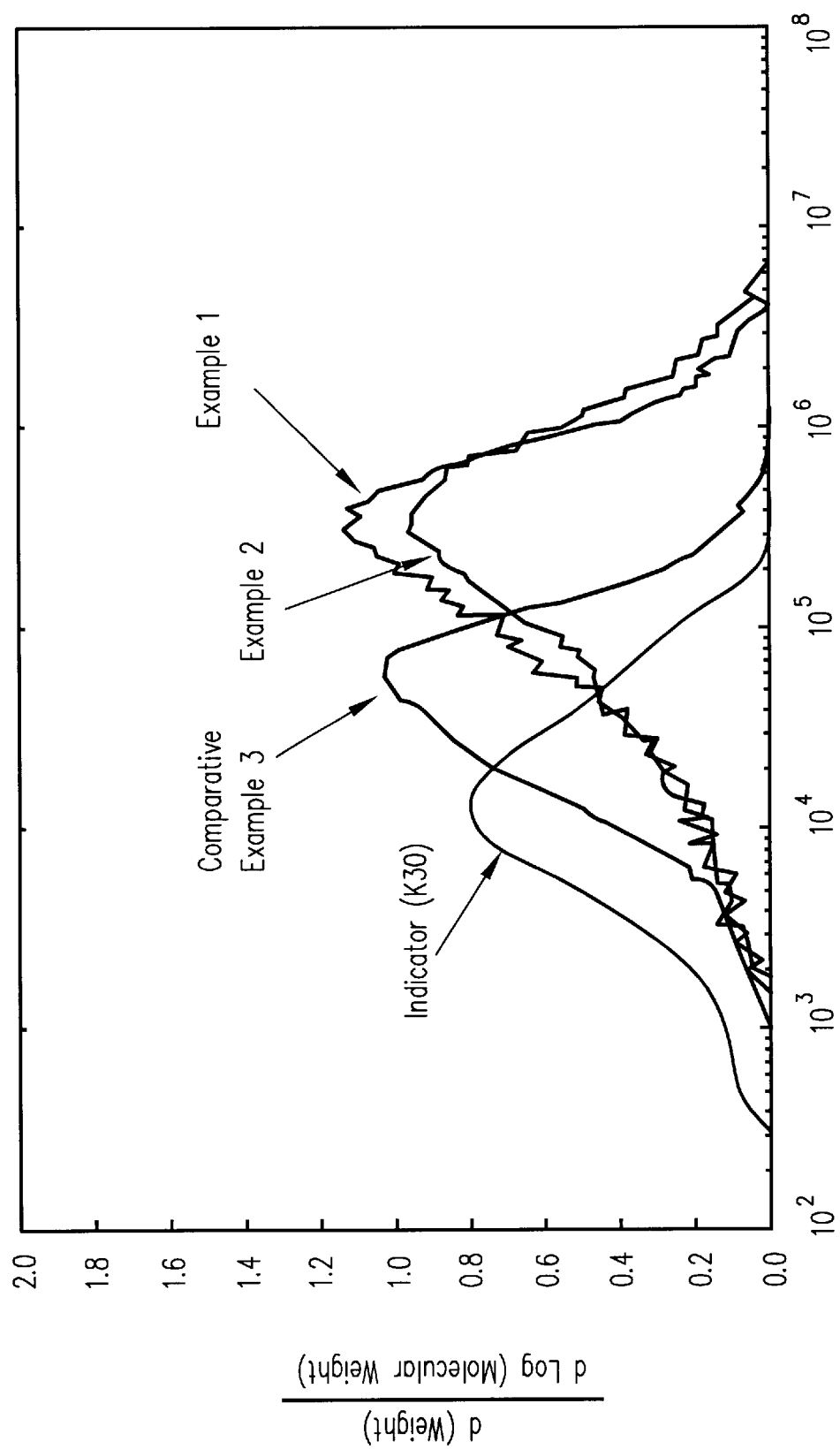
FIG. 2 is a graph showing the relationship between overall mass transfer coefficient ($K_0$) and the Stokes' radius in a membrane after gamma-ray irradiation.

In the drawings, FIG. 1 illustrates the molecular weight distribution of polyvinyl pyrrolidone, a hydrophilic polymer, in a membrane prior to gamma-ray irradiation. FIG. 2 shows relations between the overall mass transfer coefficient ($K_o$) and the Stokes' radius in a membrane after gamma-ray irradiation.

In the Examples, the measuring methods used were as follows.

(1) Measurement of Water Permeability

A hydraulic pressure of 100 mmHg is applied to the inside of the hollow yarns in a membrane module (1.6 m$^2$ in area) which is produced by sealing both ends of the hollow yarns, and the amount of the filtrate coming out of the module per unit time is measured. The water permeation performance was calculated by the following formula $$UFR(ml/hr/m^2/mmHg)=Qw/(P \times T \times A)$$

where Qw is the amount of the filtrate (ml), T the efflux time (hr), P the pressure (mmHg), and A the area of the membrane (m²) (in terms of the area of the inner surface of the hollow yarn).

(2) Measurement of Diffusing Performance with Dextran

The procedure used was basically the same as that for the dialysis performance measurement, as outlined below. Firstly, a hollow fiber membrane dialyzer has a blood side thereof perfused with 500 ml of warmed bovine serum at 37° C. at 200 ml/min for 50 minutes but without any flow of the dialysate, then the dialysate is removed and filtration, controlled by the flow rate of the perfusate, occurs at a rate of 20 ml/min for 10 minutes (the forgoing process being regarded as 1-hour circulation of bovine serum). After storing for 12 hours in a refrigerator, the dialyzer is washed by priming with 2l of physiological salt solution before it is used for testing. Six dextran products (supplied by FULKA) with different respective molecular weights (−1,200, −6,000, 15,000–20,000, 40,000, 56,000, 222,000) were all dissolved in ultrafiltered water to produce a solution containing 0.5 mg/ml of each dextran product (total dextran concentration 3 mg/ml). This solution was heated up to 37° C., kept at that temperature, and supplied by a pump to the blood side (inside of the hollow yarn) at a flow rate of 200 ml/min, while ultrafiltered water kept at 37° C. was supplied from the dialysate side at a flow rate of 500 ml/min so that it formed a counter-current flow against the flow from the blood side. It was important there to adjust the filtration pressure to zero. That is, the diffusing performance of the membrane should be measured in a state where no ultrafiltration takes place. The solution was supplied continuously for 20 minutes to ensure an equilibrium, followed by sampling at the inlet on the blood side, the outlet on the blood side, and the dialysate side. The solution samples were filtered through a filter with a pore diameter of 0.5 micrometers. Analysis was carried out for the filtrate using a gel permeation chromatography column (TSKgel G3000PW supplied by Toso Co., Ltd.) under the following conditions: column temperature 40° C., pure water of liquid chromatography grade used as mobile phase, 1 ml/min, and sample loading 50 μl. The overall mass transfer coefficient was calculated from the concentration changes at the inlet and the outlet on the blood side. Prior to the measurement, the column was calibrated with five monodisperse dextran products. The following formula was used to calculate the overall mass transfer coefficient.

$$\text{Clearance, } C_L(\text{ml/min}) = \frac{CBi - CBo}{CBi} - Q_s$$

where CBi is the concentration at the module inlet, CBo the concentration at the module outlet, and $Q_B$ the rate of liquid (perfusate) feed to the module (ml/min). Overall mass transfer coefficient, $K_0$, (cm/min)

$$=Q_B/[A \times 10^4 \times (1-Q_B/Q_\theta) \times ln[1-(C_L/Q_\theta)]/[1-(C_L/Q_B)]]$$

where A is the area (m²) and $Q_\theta$ is the rate of dialysate feed to the module, and the Stokes' radius was calculated by the formula given below based on J. Brandrup, E. H. Immergut, "Polymer Handbood" (1989) VII pp. 112–113, John Wiley & Sons, Inc., and Jinko-Zoki (Artificial Organs), Vol. 13, No. 6, (1984) pp. 23–30.

Stokes' radius (Å)=0.4456×(molecular weight of dextran)$^{0.43821}$ (3) Measurement of Albumin Permeability Bovine blood (heparin-treated) with a hematocrit value of 30% and a total protein content of 6.5 g/dl, kept at a temperature of 37° C. in a blood tank, was used. The solution was supplied to the inside of hollow yarn fibres by a pump at a rate of 200 ml/min, but no dialysate was supplied to the outside. During this process, the pressure at the module outlet was adjusted to achieve a filtration rate of 20 ml/min per m² of the module area (which is equivalent to 32 ml/min for 1.6 m²), and the filtrate and the blood from the outlet were fed back to the blood tank. After one hour from the start of reflux, the blood at the inlet and the outlet on the hollow yarn side and the filtrate were sampled. Samples from the blood side and those from the filtrate side were analyzed by the BCG method and the CBB method kit (Wako Pure chemical Industries, Ltd.), respectively, and the albumin permeability (%) was calculated from these concentrations:

$$\text{albumin permeability }(\%) = \frac{2 \times C_F}{(CBi + CBo)} \times 100$$

where $C_F$, CBi, and CBo are the albumin concentration in the filtrate, at the module inlet, and at the module outlet, respectively.

(4) Measurement of Molecular Weight Distribution of Polyvinyl Pyrrolidone by Gel Permeation Chromatography A 100 mg portion of a hollow yarn after being subjected to required coagulation/rinsing processes was dissolved in 5 ml of methylene chloride before gamma-ray irradiation, and subjected to water extraction in the presence of a salt to obtain a solution. It was then subjected to centrifugal separation (20,000 rpm×10 min) and the water layer was filtered through a filter with a pore diameter of 0.5 micrometers to obtain a sample liquid. Analysis of this liquid was carried out at a temperature of 23° C. using two serially-connected Toso TSK-gel-GMPWx1 columns with a theoretical number of steps of 8,900 under the following conditions: 0.08M tris buffer (pH 7.9) used as mobile phase, flow rats 1 ml/min, and sample loading 0.3 μl. The molecular weight distribution was determined using five monodisperse polyethylene glycol products as reference material.

(5) Weight Average Molecular Weight of Polyvinyl Pyrrolidine in Spinning Solution The weight average molecular weight of the polyvinyl pyrrolidone to be incorporated in the spinning solution, was determined by a so-called K value, from which the weight average molecular weight was calculated using the following equation, also illustrated graphically in FIG. 15 of the BASF Technical Information literature entitled "Kollidon: Polyvinylpryrrolidone for the pharmaceutical industry":

$$Mw = a \times K^{2.97159}$$

where Mw is the weight average molecular weight

K is the K value; and a is exp (1.055495).

(6) Measurement of Polyvinyl Pyrrolidone Content by Elemental Analysis

A sample irradiated with gamma-ray was exsiccated at normal temperature with a vacuum pump. A 10 mg portion of the sample was analyzed with a CHN coder, and the polyvinyl pyrrolidone content was calculated from the nitrogen content. Measurements were also made for the insolubilized material obtained in paragraph (6), and the contents of the components originating from polyvinyl pyrrolidone and polysulfone were calculated.

(7) Measurement of Insolubilized Material Content

A 10 g portion of a hollow yarn irradiated with gamma-rays was prepared and dissolved in 100 ml of dimethylformamide at room temperature. The solution was subjected to centrifugal separation at 1,500 rpm for 10 minutes to separate insoluble material, and the supernatant liquid was discarded. This process was repeated three times. The solid material obtained was subjected to evaporation and exsiccation, and its weight was used to calculate the content of the insoluble material.

EXAMPLE 1

18 parts of polysulfone (Amoco Udel-P3500), 3 parts of polyvinyl pyrrolidone (BASF K90), and 6 parts of polyvinyl pyrrolidone (BASF K30) were added to 72 parts of dimethylacetamide and 1 part of water, followed by heating for dissolution to provide a solution for membrane formation. The viscosity of the solution was 70 poise at 30° C. This solution was introduced into a spinning block at 50° C. and fed, as a sheath liquid, along with a core liquid, which was a solution consisting of 65 parts of dimethylacetamide and 35 parts of water, to an annular extrusion orifice provided by an axial end of a pair of coaxial pipes, which annular extrusion orifice had an outside diameter of 0.3 mm and an inside diameter of 0.2 mm. The core and sheath liquids were discharged from the orifice into a dry zone having a length of 250 mm and containing moist air at a temperature of 30° C. and a dew point of 28° C., and thence into a coagulation bath containing a water/dimethylacetamide mixture (80/20 by weight) at 40° C. for 20 seconds to form a hollow fiber membrane which was then rinsed with water at 80° C. for 20 seconds. This hollow yarn membrane was taken up at a speed of 40 m/min and packaged into a case so that its area became 1.6 cm², followed by potting to produce a module. The molecular weight distribution of the residual polyvinyl pyrrolidone in the hollow yarn was determined prior to gamma-ray irradiation by gel permeation chromatography. Results showed that the chains with molecular weights less than 100,000 and those with molecular weights 100,000 or more accounted for 27% and 73%, respectively. The overall mass transfer coefficient ($K_0$) of the module prior to gamma-ray irradiation measured 0.0025 cm/min for a Stokes' radius of 45 Å, and its water permeation performance and albumin permeability were 980 ml/hr/m²/mmHg and 1.4%, respectively. The overall mass transfer coefficient ($K_0$), water permeation performance, and albumin permeability were measured again after gamma-ray irradiation at 20–40 KGy by the same procedure. Results showed the $K_0$ was 0.0025 cm/min for a Stokes' radius of 40 Å, the water permeation performance 1,000 ml/hr/m²/mmHg, and the albumin permeability 1.5%. Elemental analysis revealed that polyvinyl pyrrolidone in the hollow yarn membrane accounted for 8%. The insoluble material in the hollow yarn after gamma-ray irradiation accounted for 11%. Analysis of the composition of the insolubilized material showed that the components originating from polysulfone and polyvinyl pyrrolidone accounted for 26% and 74%, respectively.

EXAMPLE 2

18 parts of polysulfone (Amoco Udel-P3500), 4 parts of polyvinyl pyrrolidone (BASF K90), and 5 parts of polyvinyl pyrrolidone (BASF K30) were added to 72 parts of dimethylacetamide and 1 part of water, followed by heating for dissolution to provide a solution for membrane formation. The viscosity of the solution was 120 pose at 30° C. A hollow fiber membrane was prepared and incorporated in a module by the respective procedures described in Example 1. The molecular weight distribution of the residual polyvinyl pyrrolidone in the hollow yarn was determined prior to gamma-ray irradiation by gel permeation chromatography. Results showed that the chains with molecular weights less than 100,000 and those with molecular weights of 100,000 or more accounted for 35% and 65%, respectively. The overall mass transfer coefficient ($K_0$), water permeation performance, and albumin permeability were measured after gamma-ray irradiation. Results showed that $K_0$ was 0.0025 cm/min for a Stokes' radius of 33 Å, the water permeation performance 800 ml/hr/m²/mmHg, and the albumin permeability 3.0%. Elemental analysis revealed that polyvinyl pyrrolidone is the hollow yarn membrane accounted for 9%. The insoluble material in the hollow yarn after gamma-ray irradiation accounted for 12%. Analysis of the composition of the insolubilized material showed that the components originating from polysulfone and polyvinyl pyrrolidone accounted for 20% and 80%, respectively.

EXAMPLE 3

18 parts of polysulfone (Amoco Udal-P3500) and 9 parts of polyvinyl pyrrolidone (BASF K60) were added to 72 parts of dimethylacetamide and 1 part of water, followed by heating for dissolution to provide a solution for membrane formation. The viscosity of the solution was 100 poise at 30° C. A hollow fiber membrane was prepared and incorporated in a module by the respective procedures described in Example 1. The molecular weight distribution of the residual polyvinyl pyrrolidone in the hollow yarn was determined prior to gamma-ray irradiation by gel permeation chromatography. Results showed that the chains with molecular weights less than 100,000 and those with molecular weights of 100,000 or more accounted for 40% and 60%, respectively. The overall mass transfer coefficient ($K_0$), water permeation performance, and albumin permeability were measured after gamma-ray irradiation. Results showed that $K_0$ was 0.0025 cm/min for a Stokes' radius of 35 Å, the water permeation performance 500 ml/hr/m²/mmHg, and the albumin permeability 1.8%. Elemental analysis revealed that polyvinyl pyrrolidone in the hollow yarn membrane accounted for 5%. The insoluble material in the hollow yarn after gamma-ray irradiation accounted for 10%. Analysis of the composition of the insolubilized material showed that the components originating from polysulfone and polyvinyl pyrrolidone accounted for 15% and 85%, respectively.

COMPARATIVE EXAMPLE 1

18 parts of polysulfone (Amoco Udel-P3500), 1.5 parts of polyvinyl pyrrolidone (BASF K90), and 7.5 parts of polyvinyl pyrrolidone (BASF K30) were added to 72 parts of dimethylacetamide and 1 part of water, followed by heating for dissolution to provide a solution for membrane formation. The viscosity of the solution was 60 poise at 30° C. A hollow fiber membrane was produced and a module was prepared from the membrane by the respective procedures described in Example 1. The molecular weight distribution of the residual polyvinyl pyrrolidone in the hollow yarn was determined prior to gamma-ray irradiation by gel permeation chromatography. Results showed that the chains with molecular weights less than 100,000 and those with molecular weights of 100,000 or more accounted for 60% and 40%, respectively. The overall mass transfer coefficient ($K_0$), water permeation performance, and albumin permeability were measured after gamma-ray irradiation. Results showed that $K_0$ was 0.0025 cm/min for a Stokes' radius of 25 Å, the water permeation performance 600 ml/hr/m²/mmHg, and the albumin permeability 0.5%. Elemental analysis revealed that polyvinyl pyrrolidone in the hollow yarn membrane accounted for 4%. The insoluble material in the hollow yarn after gamma-ray irradiation accounted for 0.15%. Analysis of the composition of the insolubilized material showed that the components originating from polysulfone and polyvinyl pyrrolidone accounted for 10% and 90%, respectively.

COMPARATIVE EXAMPLE 2

18 parts of polysulfone (Amoco Udel-P3500) and 7 parts of polyvinyl pyrrolidone (BASF K90) were added to 74 parts of dimethylacetamide and 1 part of water, followed by heating for dissolution to provide a solution for membrane formation. The viscosity of the solution was 250 poise at 30° C. A hollow fiber membrane was produced and a module was prepared from the membrane by the respective procedures described in Example 1. The molecular weight distribution of the residual polyvinyl pyrrolidone in the hollow yarn was determined prior to gamma-ray irradiation by gel permeation chromatography. Results showed that the chains with molecular weights less than 100,000 and those with molecular weights of 100,000 or more accounted for 8% and 92%, respectively. The overall mass transfer coefficient ($K_O$), water permeation performance, and albumin permeability were measured after gamma-ray irradiation. Results showed that $K_O$ was 0.0025 cm/min for a Stokes' radius of 28 Å, the water permeation performance 120 ml/hr/m²/mmHg, and the albumin permeability 4.5%. Elemental analysis revealed that polyvinyl pyrrolidone in the hollow yarn membrane accounted for 16%. The insoluble material in the hollow yarn after gamma-ray irradiation accounted for 20%. Analysis of the composition of the insolubilized material showed that the components originating from polysulfone and polyvinyl pyrrolidone accounted for 4% and 96%, respectively.

COMPARATIVE EXAMPLE 3

18 parts of polysulfone (Amoco Udel-P3500) and 9 parts of polyvinyl pyrrolidone (BASF K30) were added to 72 parts of dimethylacetamide and 1 part of water, followed by heating for dissolution to provide a solution for membrane formation. The viscosity of the solution was 30 poise at 30° C. A hollow fiber membrane was produced and a module was prepared from the membrane by the respective procedures described in Example 1. The molecular weight distribution of the residual polyvinyl pyrrolidone in the hollow yarn was determined prior to gamma-ray irradiation by gel permeation chromatography. Results showed that the chains with molecular weights less than 100,000 and those with molecular weights of 100,000 or more accounted for 80% and 20%, respectively. The overall mass transfer coefficient ($K_O$), water permeation performance, and albumin permeability were measured after gamma-ray irradiation. Results showed that $K_O$ was 0.0025 cm/min for a Stokes' radius of 28 Å, the water permeation performance 710 ml/hr/m²mmHg, and the albumin permeability 0.02%. Elemental analysis revealed that polyvinyl pyrrolidone in the hollow yarn membrane accounted for 4%. the insoluble material in the hollow yarn after gamma-ray irradiation accounted for 0.5%. Analysis of the composition of the insolubilized material showed that the components originating from polysulfone and polyvinyl pyrrolidone accounted for 42% and 58%, respectively.

The above results illustrate that if the molecular weight of the hydrophilic polymer in a permselective membrane can be controlled, such a membrane, when applied medically, can achieve a low albumin permeability while maintaining a high uremic toxin diffusing performance over a wide range of molecular weights, i.e. from low to high. When used for hemodialysis, hemofiltration, hemodialysis filtration, etc., therefore, a good performance is expected in improving the disease conditions of patients with renal failure. With its high water permeability, furthermore, the membrane can be applied to filtration for endotoxin removal for cleaning dialysate.

EXAMPLE 4

In the manner of Example 1, 18 parts of polysulfone (Amoco Udel-P3500), 2 parts of polyvinyl pyrrolidone (BASF K90), and 7 parts of polyvinyl pyrrolidone (BASF K30) were added to 72 parts of dimethylacetoamide and 1 part of water, followed by heating for dissolution to provide a solution for membrane formation. The viscosity of the solution was 60 poise at 30° C. A hollow fiber membrane was prepared and incorporated in a module by the respective procedures described in Example 1. The molecular weight distribution of the residual polyvinyl pyrrolidone in the hollow fiber yarn was determined prior to gamma-ray irradiation by gel permeation chromatography. Results showed that the chains with molecular weight less than 100,000 and those with molecular weight of 100,000 or more accounted 48% and 52%, respectively. The overall mass transfer coefficient ($K_O$), water permeation performance and albumin permeability were measured after gamma-ray irradiation. Results showed that $K_O$ was 0.0025 cm/min for a Stoke's radius of 32 Å, the water permeation performance 920 ml/hr/m²/mmHg and the albumin permeability of 1.8%. Elemental analysis revealed that polyvinyl pyrrolidone in the hollow yarn membrane accounted for 4%. The insoluble material in the hollow yarn after gamma-ray irradiation accounted for 8%. Analysis of the composition of the insolubilized material showed that the components originated from polysulfone and polyvinyl pyrrolidone accounted for 16% and 84%, respectively.

COMPARATIVE EXAMPLE 4

18 parts of polysulfone (Amoco Udel-P3500), 7 parts of polyvinyl pyrrolidone (BASF K90), and 2 parts of polyvinyl pyrrolidone (BASF K30) were added to 72 parts of dimethylacetoamide and 1 part of water, followed by heating for dissolution to provide a solution for membrane formation. The viscosity of the solution was 260 poise at 30° C. A hollow fiber membrane was prepared and incorporated in a module by the respective procedures described in Example 1. The molecular weight distribution of the residual polyvinyl pyrrolidone in the hollow fiber yarn was determined prior to gamma-ray irradiation by gel permeation chromatography. Results showed that the chains with molecular weight less than 100,000 and those with molecular weight of 100,000 or more accounted 6% and 94%, respectively. The overall mass transfer coefficient ($K_O$), water permeation performance and albumin permeability were measured after gamma-ray irradiation. Results showed that $K_O$ was 0.0025 cm/min for a Stoke's radius of 26 Å, the water permeation performance 190 ml/hr/m²/mmHg and the albumin permeability of 4.5%. Elemental analysis revealed that polyvinyl pyrrolidone in the hollow yarn membrane accounted for 12%. The insoluble material in the hollow yarn after gamma-ray irradiation accounted for 18%. Analysis of the composition of the insolubilized material showed that the components originated from polysulfone and polyvinyl pyrrolidone accounted for 6% and 94%, respectively.

The data obtained in example 4 and Comparative Example 4 are summarized and illustrated graphically in the attached figures, including data relating to water permeability in FIG. 3 and data of the various hollow fibers and from the diffusion (clearance) performance in FIG. 4. These data show the best water permeability and diffusion performance was obtained in a ratio of about 6(K30):3(K90).

FIGS. 3 and 4 relate to proportions of low molecular weight (Mw) polyvinyl pyrrolidone (PVP) to high Mw PVP in terms of amount present in weight ratio in the spinning solution. Membranes are formed by casting or otherwise forming the spinning solution into a suitable configuration, typically a hollow tube or fiber, then removing the solvent. During this process a portion of the PVP will be dissolved out of the membrane in the coagulating bath and in the rinsing bath. Generally low MW PVP is more soluble in the coagulating bath and the rinsing bath than the high MW PVP. This means the low MW PVP in the final product will be in a lower proportion to the high MW PVP than in the spinning solution. This is illustrated in the following table:

| Examples | A | B |
|---|---|---|
| 1 | 6:3 | 27:73 |
| 2 | 5:4 | 35:65 |
| 4 | 7:2 | 48:52 |
| Comp. ex. | 2:7 | 6:94 |

A = K30 to K90 weight ratio in the spinning solution
B = LM PVP to High MW PVP ratio in the membrane determined by GPC

What is claimed is:

1. A membrane material for removing uremic toxins from the blood of patients, the membrane material comprising a polysulfone and a polyvinyl pyrrolidone wherein the polyvinyl pyrrolidone is present in the membrane material in an amount of 3 to 15% by weight of the polysulfone and the polyvinyl pyrrolidone, and the polyvinyl pyrrolidone consists of 10–50 wt. %, based on the total weight of polyvinyl pyrrolidone, of a low molecular weight component having a molecular weight, as measured by gel permeation chromatography, less than 100,000 and 90–50 wt. %, based on the total weight of polyvinyl pyrrolidone, of a high molecular weight component having a molecular weight, as measured by gel permeation chromatography, of 100,000 or more wherein a membrane made of the membrane material has an overall mass transfer coefficient ($K_o$), for a Stoke's radius of at least 30 Å, as determined by dextran diffusion, of 0.0025 cm/min or more and a permeability to albumin of 4% or less.

2. The membrane material of claim 1 wherein the amount of said low molecular weight component is 20–70 wt % and the amount of said high molecular with component is 80–30 wt. %.

3. The membrane material of claim 2 wherein the amount of said low molecular weight component is 20–50 wt. % and the amount of said high molecular weight component is 80–50 wt. %.

4. A membrane according to claim 1, having a permeability to albumin of 3% or less.

5. A membrane according to claim 4, having a permeability to albumin of 2% or less.

6. A membrane material comprising a polysulfone and polyvinyl pyrrolidone wherein the polyvinyl pyrrolidone is present in the membrane material in an amount of 3 to 15% by weight of the polysulfone and the polyvinyl pyrrolidone, and the polyvinyl pyrrolidone consists of 10–50 wt. %, based on the total weight of polyvinyl pyrrolidone, of a low molecular weight component having a molecular weight, as measured by gel permeation chromatography, less than 100,000 and 90–50 wt. %, based on the total weight of polyvinyl pyrrolidone, of a high molecular weight component having a molecular weight, as measured by gel permeation chromatography, of 100,000 or more, which membrane material is partially crosslinked wherein a membrane made of the membrane material has an overall mass transfer coefficient ($K_o$), for a Stoke's radius of a least 30 Å, as determined by dextran diffusion, of 0.0025 cm/min or more and a permeability to albumin of 4% or less.

7. The membrane material according to claim 6, wherein at least a proportion of the crosslinking groups in the respective polymer chains crosslink the polyvinyl pyrrolidone and the polysulfone.

8. The membrane material according to claim 6, which is soluble in a polar organic solvent at 25° C. to an extent such that 2–15 wt. %, based on the total weight of the membrane material, is insoluble in the same polar organic solvent.

9. The membrane material according to claim 8, wherein 15–40 wt. % of the material not soluble in the polar organic solvent is provided by the polysulfone and 85–60 wt. % is provided by the polyvinyl pyrrolidone.

10. The membrane material according to claim 8, wherein the polar organic solvent is dimethylformamide.

11. The membrane material according to claim 6, wherein the polyvinyl pyrrolidone is present in the membrane in an amount of 3–15% by weight of the total weight of the polysulfone and polyvinyl pyrrolidone.

12. A method of producing a polymeric membrane comprising the steps of:
(a) forming a solution comprising a polysulfone, a polyvinyl pyrrolidone and a solvent, the polyvinyl pyrrolidone prepared by mixing at least two polyvinyl pyrrolidones having different respective molecular weights, a low molecular weight polyvinyl pyrrolidone having a weight average molecular weight, measured by gel permeation chromatography, of less than 100,000 and a high molecular weight polyvinyl pyrrolidone having a molecular weight of at least 100,000, the solvent being capable of dissolving both of the polysulfone and the polyvinyl pyrrolidone, wherein the solution contains from 1.8–20 wt. %, base don the total weight of the solution, of said high molecular weight polyvinyl pyrrolidone, and wherein the weight ratio of low to high molecular weight polyvinyl pyrrolidone in the solution formed in step (a) is between about 7:2 to about 2:7,
(b) forming said solution into a membrane, and
(c) removing the solvent from the membrane to obtain the polymeric membrane.

13. The method of claim 12, wherein the weight ratio of low molecular weight polyvinyl pyrrolidone to high molecular weight polyvinyl pyrrolidone is about 6:3 to about 5:4.

14. The method according to claim 12, wherein the solution prepared in step (a) also contains an additive substantially incompatible with the polyvinyl pyrrolidone but compatible with the polysulfone and the solvent, and wherein the additive is removed from the membrane formed in step (b).

15. The method according to claim 12, wherein the high molecular weight component has a weight average molecular weight of at least five times as high as the weight average molecular weight of the low molecular weight component.

16. The method according to claim 12 or 13 including the additional step of subjecting the membrane to an insolubilization step.

17. The method according to claim 16, wherein the membrane is insolubilized by subjecting the membrane material to cross linking by γ-ray or electron beam irradiation heating or chemical treatment.

18. A membrane material for removing uremic toxins from the blood of patients, the membrane material comprising a polysulfone and a polyvinyl pyrrolidone wherein the polyvinyl pyrrolidone is present in the membrane material in an amount of 3 to 15% by weight of the total weight of the polysulfone and the polyvinyl pyrrolidone and the polyvinyl pyrrolidone consists of 10–50 wt. %, based on the total weight of polyvinyl pyrrolidone, of a low molecular weight component having a molecular weight, as measured by gel permeation chromatography, less than 100,000 and 90–50 wt. %, based on the total weight of polyvinyl pyrrolidone, of a high molecular weight component having a molecular weight, as measured by gel permeation chromatography, of 100,000 or more wherein a membrane made of the membrane material has an overall mass transfer coefficient ($K_O$), for a Stoke's radius of a least 30 Å, as determined by dextran diffusion, of 0.0025 cm/min or more and a permeability to albumin of 4% or less.

* * * * *